United States Patent [19]

Rose et al.

[11] 4,211,677
[45] Jul. 8, 1980

[54] POLYPHOSPHAZENE COPOLYMERS WITH PHENOXY AND WITH PHENYLPHENOXY AND/OR NAPHTHOXY GROUPS, AND AQUEOUS DISPERSIONS

[75] Inventors: Selwyn H. Rose, Highland Park; Ashok Chattopadhyay, Mt. Prospect, both of Ill.

[73] Assignee: DeSoto, Inc., Des Plaines, Ill.

[21] Appl. No.: 859,748

[22] Filed: Dec. 12, 1977

[51] Int. Cl.$^2$ .................. C08G 73/00; C08K 5/09; C08K 5/36
[52] U.S. Cl. ................. 260/13; 260/29.2 R; 260/30.6 R; 260/30.8 R; 528/168
[58] Field of Search .............. 260/29.2 R, 29.2 M, 260/47 P, 13; 528/168

[56] References Cited

U.S. PATENT DOCUMENTS

| 3,299,001 | 1/1967 | Kaplan | 260/47 P |
|---|---|---|---|
| 3,357,931 | 12/1967 | Rice et al. | 260/47 P |
| 3,370,020 | 2/1968 | Allcock et al. | 260/47 P |
| 3,422,049 | 1/1969 | McClain | 260/29.2 R |
| 3,591,530 | 7/1971 | Sollberger et al. | 260/29.2 M |
| 3,883,451 | 5/1975 | Reynard et al. | 528/168 |
| 4,053,456 | 10/1977 | Dieck et al. | 528/168 |
| 4,055,520 | 10/1977 | Diek et al. | 528/168 |
| 4,055,523 | 10/1977 | Diek et al. | 260/29.2 R |
| 4,073,824 | 2/1978 | Diek et al. | 528/168 |
| 4,076,658 | 2/1978 | Dieck et al. | 260/47 P |
| 4,124,557 | 11/1978 | Dieck et al. | 260/30.6 R |

OTHER PUBLICATIONS

Allcock et al., Inorganic Chemistry, vol. 5, No. 10, Oct. 1966, pp. 1709–1715.

*Primary Examiner*—Paul Lieberman
*Assistant Examiner*—A. H. Koeckert
*Attorney, Agent, or Firm*—Dressler, Goldsmith, Shore, Sutker & Milnamow, Ltd.

[57] ABSTRACT

This invention relates to aqueous suspensions of polyphosphazene polymers and copolymers, the production thereof, and to new halogen-free polyphosphazene copolymers having a phenoxy substituent and a second substituent selected from phenyl phenoxy, naphthoxy, and mixtures thereof.

15 Claims, No Drawings

POLYPHOSPHAZENE COPOLYMERS WITH PHENOXY AND WITH PHENYLPHENOXY AND/OR NAPHTHOXY GROUPS, AND AQUEOUS DISPERSIONS

The present invention relates to polyphosphazene polymers and copolymers in aqueous suspension, and particularly to certain halogen-free polyphosphazene copolymers which are particularly adapted to form aqueous suspensions which will air dry to form continuous coatings.

Polyphosphazene polymers and copolymers are known, but these have not been provided in aqueous suspension which is a particularly desirable form when it is desired to use the polyphosphazene for a coating or impregnating purpose. Most polyphosphazene polymers are not suited for coating application and this may partially account for the fact that coating concepts have received little attention by the art. It is particularly desired to provide such aqueous suspensions and coating compositions containing the same using halogen-free polyphosphazene copolymers which are highly soluble in organic solvents, and exhibit good film properties and which coalesce at low temperature. The absence of halogen eliminates the generation of halogen-containing fumes when the coatings are subjected to burning. Better adhesion to metal and glass substrates is also obtained.

In accordance with this invention, a polyphosphazene polymer or copolymer, and preferably a halogen-free polyphosphazene copolymer containing at least one phenoxy substituent and a second substituent selected from phenyl phenoxy, naphthoxy, and mixtures thereof, is dissolved in a volatile organic solvent to form a solvent solution. This solvent solution of polyphosphazene polymer or copolymer is dispersed in water (containing a surfactant where suspension stability is desired) and all or a portion of the volatile solvent is removed by vaporizing the same with heat. This provides an aqueous polymer suspension which is useful as a coating composition. The preferred copolymers are mostly amorphous and have a $T_g$ of at least 0° C. which confers desirable physical characteristics. So long as the $T_g$ is not excessive, coatings of the aqueous suspension will air dry to form a continuous film. Relatively high $T_g$ is a feature of this invention, and when the $T_g$ is too high for air dry, baking can be used. While useful results can be obtained regardless of how high the $T_g$ is, it is preferred that the $T_g$ not exceed 50° C. to maximize the flexibility of the film.

$T_g$ denotes the glass transition temperature of a polymer and is a well known physical parameter.

While polyphosphazene polymers and copolymers are broadly known, the specific halogen-free polyphosphazene copolymers described above are new and confer better film properties than the known halogen-free materials. Superior hardness, solubility, and impact resistance are particularly contemplated. These new copolymers are thus a feature of this invention.

Referring more particularly to the new copolymers, the production of polyphosphazene polymer is a matter of common knowledge. In this invention, the halogen groups in the polymer obtained by polymerizing phosphonitrile chloride trimer are replaced with phenoxy groups in part and most of the balance of these halogen groups are replaced by phenyl phenoxy, naphthoxy, or mixtures thereof. Any remaining halogen groups, up to 10% of the initially present halogen groups, may be replaced by diverse groups, such as methoxy phenoxy groups, vinyl phenoxy groups, allyl phenoxy groups, and the like. 4-phenyl phenoxy is the preferred phenyl phenoxy group, and 2-naphthoxy is the preferred naphthoxy group. The ratio of the phenoxy groups to the other groups in the final copolymer may range from 30:70 to 95:5, but the two types of substituents are preferably in a ratio of 40:60 to 80:20. Particularly with the phenyl phenoxy group, flexibility is maximized with a ratio of 60:40 to 80:20. The copolymers which are preferred for use herein are of high average molecular weight, normally 100,000 or higher. Molecular weight is measured by gel permeation chromatography and low molecular weight fragments are present in the mixtures which are produced.

The volatile organic solvent is subject to considerable variation for it will be appreciated that it is only a temporary carrier and all or most of this solvent is vaporized out of the final aqueous suspension. Aromatic hydrocarbons, such as toluene or xylene, are particularly preferred for these have reasonable solvency capacity for the polyphosphazene polymer or copolymer, and they are of low cost and not unduly toxic. Relatively water immiscible solvents are preferred, but are not essential.

The solvent solution of polymer is preferably added to the water with the addition being in increments with removal of solvent by vaporization either after addition is complete and the particle size established by agitation, or as the addition continues. Some of the water may also be removed to increase the solids content. In these ways, the solids content of the suspensions which are produced may exceed the solids content of the solvent solution which is used to produce it. It is also possible to add the water to the solvent solution, but this makes it more difficult to obtain a uniform suspension.

One can produce the suspension in water with continual agitation and use this suspension before it settles. On the other hand, suspension stability is frequently important, in which case surfactants, and especially nonionic and anionic surfactants, may be incorporated in the water to provide a more stable suspension. The proportion of the surfactant in the aqueous medium is conveniently from 2-10% by weight, preferably from 3-8%, based on the weight of the copolymer to be added. Usually, thickeners may also be present in the water since it is known that these can help to stabilize suspensions of water immiscible materials and to provide appropriate viscosity for coating. Carboxy methyl cellulose will illustrate an appropriate thickener.

A mixture of sodium lauryl sulfate and cetyl alcohol provides a very effective surfactant action, especially when ultrasonic agitation is used to provide the finest particle size. Much of the solvent and part of the water may be removed after agitation to provide the desired solids content, as by heating under vacuum, preferably in a rotary evaporator. From the standpoint of the fire retardancy, the preferred surfactants have the formula:

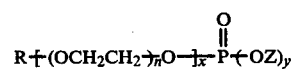

where x and y are each at least 1 and total 3, Z is selected from hydrogen and alkali metal, n is a number from about 5 to about 60 and R is a hydrocarbon-substituted phenyl group in which the hydrocarbon substituent contains from 6–22 carbon atoms. The preferred hydrocarbon substituent is a saturated hydrocarbon containing from 8 to 9 carbon atoms. The phosphate acids and salts are of about equal value, sodium and potassium salts being illustrative. An illustrative material used hereinafter is Wayfos M-60 (Wyandotte Chemical Company) which constitutes a preferred commercially available phosphate ester of the general type described above. In this product, and with reference to the structural formula, R=nonyl phenol; n=10; x=1, y=2, and Z=H.

It is stressed that the polyphosphazene copolymers are poorly soluble in organic solvents. As a result, it is essential in order to have sufficient solids content for normal coating use in the absence of excessive viscosity, to employ the polyphosphazene polymer in a suspension form, and water is of special value in this capacity. At least 15%, preferably at least 20% solids is preferred, and from about 30% to about 40% gives best results.

It is particularly pointed out that the presence of a relatively small proportion of the phenyl phenoxy or naphthoxy group considerably improves the flexibility of the polyphosphazene copolymer. Thus, in a coating pigmented with a 1:1 ratio of titanium dioxide pigment:copolymer, the phenoxy homopolymer failed a ¼ inch mandrel flexibility test while, with a ratio of from 20% to 40% and 4-phenyl phenoxy or 25% to 60% 2-naphthoxy groups in the phenoxy copolymer, the pigmented coatings passed a ⅛ inch mandrel flexibility test. This is particularly surprising for the 4-phenyl phenoxy copolymer where the presence of this group also increased the hardness of the coatings. When the phenoxy group is also replaced, as in the 4-methoxyphenoxy-4-phenylphenoxy copolymer, flexibility is very poor.

The invention is illustrated in the following examples which shows the production of an appropriate polyphosphazene copolymer, its provision in toluene solution, the production of a typical water suspension and the formation of a film therefrom.

All parts herein are by weight unless otherwise stated.

EXAMPLE 1

Phosphonitrile chloride trimer in a sealed container is heated at 250° C. for 30 hours to obtain a solid polyphosphazene polymer. The polymer is placed in a dry nitrogen atmosphere and charged with 3 parts of toluene to dissolve each part of polymer. The polymer dissolves at room temperature to provide a solution.

In a separate flask charge 650 ml diethylene glycol dimethyl ether, 23 grams sodium metal, 0.94 moles of 4-phenyl phenol and allow to stand overnight to provide sodium 4-phenyl phenylate.

In another flask mix 650 ml diethylene glycol dimethyl ether, 23 grams sodium metal and 0.94 moles of phenol to provide sodium phenylate.

Charge the sodium 4-phenyl phenylate solution to the polyphosphazene polymer solution and heat to 100° C. and then charge the sodium phenylate solution and heat to 125° C. for 24 hours. The two sodium derivatives are present in equimolar proportion and in stoichiometric balance with the chloride in the polymer. Sodium chloride is the by-product of the reaction. The temperature is then reduced to 115° C. and held for another 24 hours.

The reaction product is poured into 4 liters of methanol to precipitate a copolymer in which the polyphosphazene is substituted with a 50:50 ratio of phenyl and 4-phenyl phenoxy substituents, and this copolymer is removed and dissolved in 1 liter of tetrahydrofuran to provide a solution which is mixed into 4 liters of a water and methanol mixture (50/50) to precipitate the substituted polyphosphazene copolymer and this process of dissolution and precipitation is repeated 4 or 5 times to obtain a reasonably pure copolymer which is dissolved in toluene to form an 11% by weight solution. The sodium chloride by-product is removable by water washing alone, but the repeated precipitation procedure used in this example also removes low molecular weight fractions, and is preferred for that reason.

Use a solution of sodium lauryl sulfate and cetyl alcohol (50:50) in deionized water containing 3% thereof based on the weight of the copolymer to be added and add the copolymer solution to enough water to provide 3 parts of water per part of added copolymer with vigorous agitation to provide a dispersion. The toluene is volatile so heat is applied and the toluene is distilled away to provide an aqueous dispersion of apparently solid polymer particles (2–3 micron particle size) having a solids content of about 25%.

The dispersion product is a milky white suspension. The suspension is drawn down on an aluminum panel and dried at room temperature to produce a continuous film. The film is soft, opaque and generally white in color.

The polyphosphazene copolymer is itself fire resistant and the film under consideration is halogen-free.

In preferred practice the vigorous agitation is supplied using an ultrasonic call disruptor for 5 to 15 minutes using 150 watts to operate the ultrasonic agitator. Average particle sizes of less than about 1 micron are consistently obtained in this way.

The preferred procedure for dispersing the polymer solution is to add a solution of copolymer in toluene (140 g, 7.5% by weight) to a solution of the surfactant (6% on the basis of the dry copolymer) in deionized water. The mixture is blended at high speed for 30 minutes in a high speed blender and is then transferred into a 2 liter beaker and further dispersed with an ultrasonic cell disruptor for 5 to 15 minutes at 150 watts. During the sonification, periodic microscopic observations are made to determine the particle size. Sonification is stopped when no significant change in particle size is noted. In most cases dispersions are allowed to stand overnight at room temperature. If there is no separation of immiscible layers, the dispersion is put into a 2 liter flask along with 6–8 drops of a defoamer, toluene, and portions of water are removed by distillation under reduced pressure (60–70 mm of mercury). Best results are obtained by using a rotary evaporator.

The defoaming agent can be constituted by any commercial defoamer and is merely used as a matter of convenience since foam production does not prevent the formation of a useful suspension.

EXAMPLE 2

Poly(dichlorophosphazene) 440 g (7.1 moles) is dissolved in 3200 ml of dried and distilled toluene in a 5 liter flask under a nitrogen blanket. Complete dissolution of the polymer is achieved in 24 hours and the solution is transferred into a 24 liter flask fitted with a stirrer, reflux condenser, and an addition funnel.

A solution of sodium-4-phenylphenoxide obtained by reacting 48 g (2.08 g-atoms) of sodium with 389 g (2.29 moles) of 4-phenyl phenol in 2600 ml of dried and distilled diethylene glycol dimethyl ether is slowly added to the polymer solution over a period of 1½ hours. The temperature is raised to 100° C. and a solution of sodium phenoxide, obtained by reacting 143 g (6.23 g-atoms) sodium with 650 g (7.0 moles) phenol in 2600 ml dried and distilled diethylene glycol dimethyl ether is then added over a period of 1½ hours. The reaction mixture is heated to 125° C. for 24 hours and to 115° C. for an additional 24 hours and then cooled to room temperature and poured into 16 liters of methanol to give a gummy solid. The polymer was purified by dissolving it in tetrahydrofuran and reprecipitating it into water (4 times) and methanol (2 times). The polymer product is then cut into small pieces, and dried under vacuum at room temperature for two days followed by two additional days at 120° F. The intrinsic viscosity of the polymer is 1.3 dl/g in tetrahydrofuran at 30° C. The phenoxy and 4-phenyl phenoxy substituents are present in approximately a 3:1 ratio and the phosphazene copolymer has a Tg of 17° C. and forms a continuous film upon coalescence at room temperature.

Using the commercially available phosphate ester surfactant Wayfos M-60 (Wyandotte Chemical Company), 133 grams of a 7.5% by weight toluene solution are added to 400 grams of water containing 0.6 grams of the phosphate ester surfactant. After completion of the sonic dispersion and subsequent vaporization of the toluene and some of the water, a reasonably stable suspension containing 25% by weight of nonvolatile solids is obtained. The particle size is in the range of 0.5–1 micron and the suspension is substantially unaltered after storage for 2 weeks.

The invention is defined in the claims which follow. We claim:

1. A hologen-free polyphosphazene copolymer having at least one phenoxy substituent and a second substituent selected from phenyl phenoxy, naphthoxy and mixtures thereof in a ratio of 30:70 to 95:5.

2. A polyphosphazene copolymer as recited in claim 1 having a $T_g$ between 0° C. and 50° C., and said copolymer has a molecular weight of at least 100,000.

3. A polyphosphazene copolymer as recited in claim 2 in which the two named substituents are present in a ratio of 40:60 to 80:20, and the copolymer is mostly amorphous.

4. A polyphosphazene copolymer as recited in claim 1 in which the two substituents are phenoxy and 4-phenyl phenoxy, these two substituents being present in a ratio of 60:40 to 80:20.

5. A polyphosphazene copolymer as recited in claim 1 in which the two substituents are phenoxy and 2-naphthoxy, these two substituents being present in a ratio of 75:25 to 40:60.

6. Water having suspended therein particles of polyphosphazene copolymer having a molecular weight of at least 100,000 and a $T_g$ of at least 0° C., said polyphosphazene copolymer being a halogen-free copolymer having at least one phenoxy substituent and a second substituent selected from phenyl phenoxy and naphthoxy in a ratio of 30:70 to 95:5.

7. A water suspension as recited in claim 6 in which said polyphosphazene copolymer is present in an amount to provide a solids content of at least 15%.

8. A water suspension as recited in claim 6 in which said polyphosphazene copolymer is present in an amount to provide a solids content of at least 20%.

9. A water suspension as recited in claim 6 in which the two named substituents are present in a ratio of 40:60 to 80:20.

10. A water suspension as recited in claim 6 in which a surfactant is present to stabilize the suspension.

11. A water suspension as recited in claim 10 in which said surfactant is present in an amount of from 2–10%, based on the weight of said polyphosphazene copolymer.

12. A water suspension as recited in claim 10 in which said surfactant has the formula:

where x and y are each at least 1 and total 3, Z is selected from hydrogen and alkali metal, n is a number from about 5 to about 60 and R is a hydrocarbon-substituted phenyl group in which the hydrocarbon substituent contains from 6–22 carbon atoms.

13. A water suspension as recited in claim 12 in which said hydrocarbon substituent is a saturated hydrocarbon containing 8 or 9 carbon atoms.

14. A water suspension as recited in claim 10 in which the particles of polyphosphazene copolymer have an average particle size of less than about 1 micron and are present in an amount to provide a solids content of from about 30% to about 40% by weight.

15. A water suspension as recited in claim 6 in which a thickener is present to help stabilize the suspension and provide appropriate viscosity for coating.

* * * * *